United States Patent [19]
Pflaumbaum et al.

[11] Patent Number: 4,781,737
[45] Date of Patent: Nov. 1, 1988

[54] APPARATUS FOR THE INJECTION OF FLUE GASES INTO A COOLING TOWER

[76] Inventors: Heinz J. Pflaumbaum, Brunsbergweg, 6A, D-5810 Witten-Heven, Fed. Rep. of Germany; Pierre L. Lemmens, Rue Pieter, 56, B-1190 Brussels, Belgium

[21] Appl. No.: 46,720

[22] Filed: May 6, 1987

Related U.S. Application Data

[63] Continuation-in-part of Ser. No. 848,301, Apr. 4, 1986, Pat. No. 4,673,421.

[30] Foreign Application Priority Data

May 14, 1986 [BE] Belgium .............................. 0/216658

[51] Int. Cl.$^4$ ............................................. B01D 45/08
[52] U.S. Cl. ........................................ 55/238; 55/440; 55/464; 55/257.2; 261/109; 261/DIG. 11
[58] Field of Search ................. 55/186, 224, 237, 238, 55/257 PV, 257 QV, 261, 440, 458, 462, 464; 261/96, 102, 105, 109, DIG. 11

[56] References Cited

U.S. PATENT DOCUMENTS

| | | | |
|---|---|---|---|
| 2,596,105 | 5/1952 | Schneible | 261/109 X |
| 3,637,195 | 1/1972 | Blazer et al. | 261/109 X |
| 3,944,636 | 3/1976 | Schuldenberg et al. | 261/109 X |
| 4,673,421 | 6/1987 | Schwickert et al. | 55/238 |

FOREIGN PATENT DOCUMENTS 198146 10/1986 European Pat. Off. .... 261/DIG. 11

*Primary Examiner*—Robert Spitzer
*Attorney, Agent, or Firm*—Leonard Bloom

[57] ABSTRACT

An apparatus is disclosed which receives flue gases from a flue gas source, reduces the velocity of the gases, and maintains the gases at a reduced substantially uniform velocity for delivery to a cooling tower. The apparatus includes a conduit for receiving the gases at a first velocity from the flue gas source. The conduit has a longitudinal slot formed therein at the uppermost portion thereof. A tank having respective side surfaces is in communication with the tower and is positioned on the conduit; the tank overlies the conduit and receives gases from the longitudinal slot in the conduit. A plurality of arcuately-shaped, inclined, spaced-apart deflectors contact gases having the first velocity entering the tank, thereby reducing the velocity of the gases to a second reduced velocity, controlling the velocity of the gases received in the tank, and maintaining the gases on the side surface of the tank at a substantially uniform velocity. Drop separator panels are disposed in each side surface, whereby the gases having a uniform velocity pass therethrough to the tower. In a preferred embodiment, the spacing between the deflectors and the angle of inclination of the deflectors are selectively adjustable.

26 Claims, 3 Drawing Sheets

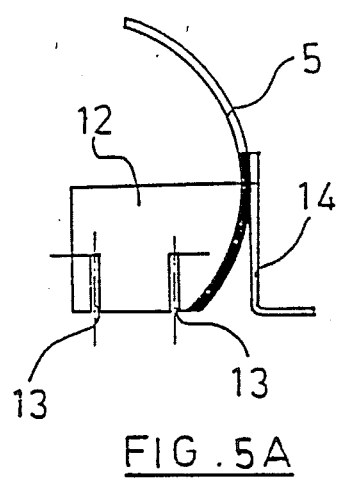
FIG. 5A
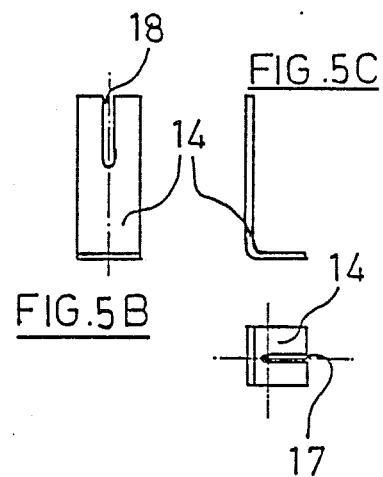
FIG. 5B
FIG. 5C
FIG. 5D
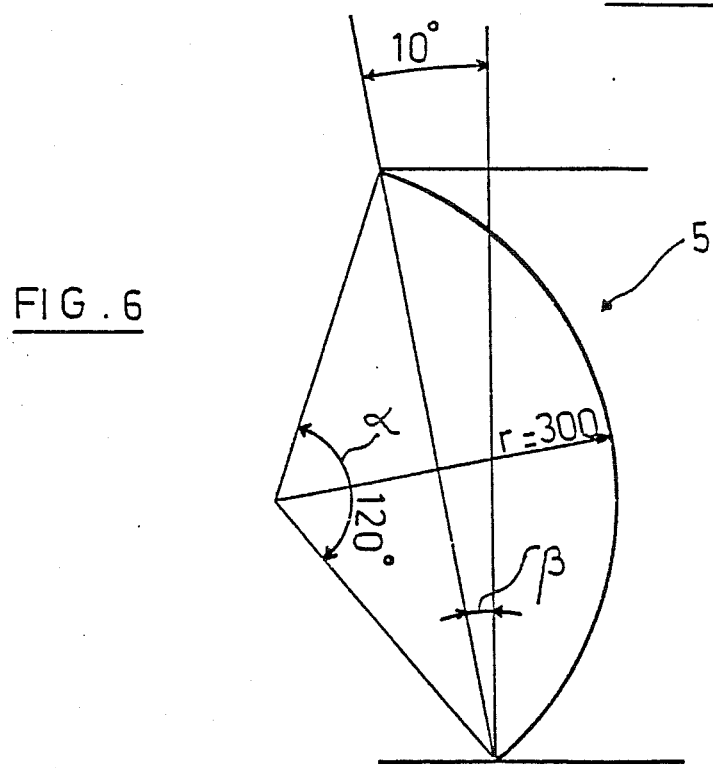
FIG. 6

APPARATUS FOR THE INJECTION OF FLUE GASES INTO A COOLING TOWER

CROSS-REFERENCE TO RELATED APPLICATION

This application is a continuation-in-part of copending U.S. application Ser. No. 848,301, filed Apr. 4, 1986, which has since matured into U.S. Pat. No. 4,673,421 issued June 16, 1987. The disclosure of the said parent application, Ser. No. 848,301, in its entirety is hereby incorporated by reference herein.

FIELD OF THE INVENTION

The present invention relates to installations or apparatuses for discharging flue gases into atmospheric cooling towers (hereinafter referred to merely as "towers"), wherein the flue gas or gases are purified by the so-called moist method and and are generated by fossil-fuel boilers in electric power stations.

BACKGROUND OF THE INVENTION

In U.S. Pat. No. 4,673,421 issued June 16, 1987, an installation has been disclosed including at least one horizontal conduit (or pipe) system which carries the gases to the tower above the exchange body, the water distribution system and the drift eliminators. The conduit is formed at its top or uppermost level with a slot which extends over almost the entire length thereof. Above the conduits are tanks which receive the gases through the slot, and which discharge the gases horizontally into the tower through drop separator panels.

The gases at the piping inlet have a relatively high speed (or first velocity) which is usually 15 to 25 meters per second, and the gases are discharged into the tower at a relatively low speed (or second velocity). This second velocity must be between a lower limit and an upper limit, between which the drop separators are efficient. These limits are e.g. 3 meters per second and 6 meters per second, respectively.

The speed of the gases at the outlet of the installation has to be kept as uniform as possible both along the panels and up them.

In a first embodiment of the installation known in the art, uniformity of the speed of the gases flowing in the longitudinal direction of the piping is attempted by keeping the slot narrow. Unfortunately, this produces a relatively large pressure drop when the gases flow from the conduit into the tanks. This arrangement has the following consequences: first, a considerable amount of energy is consumed to overcome the pressure drop that occurs when the flue gases pass through the slot; and, second, it is difficult to assure that the range of the second velocity will be as narrow as desired.

In a second embodiment of the installation known in the art, the slot is formed relatively wide. In this arrangement, uniformity of the speed (or velocity) of gases leaving the drop separator panels is obtained by disposing deflectors inside the conduit (or pipe) system. In these cases, the uniformity of gas speed is very satisfactory; however, the deflectors are very expensive. Also, such an arrangement makes replacement and repair of the deflectors difficult and costly. Finally, such deflectors are not readily adjustable for various specific needs.

Thus, it can be seen that there remains a need for a device for distributing gases from the piping (or conduit) to the tanks such that: first, the flow rate is substantially the same all along the pipe system; second, the gas flow at the tank inlets enables the gases to be sufficiently uniformly distributed up the drop separator panels disposed in the side surfaces of the tanks; and third, the device may be fabricated and maintained relatively inexpensively.

SUMMARY OF THE INVENTION

Accordingly, it is a primary object of the present invention to provide an apparatus for distributing gases from a conduit to a tank, so that the gases in the tank may be distributed to a cooling tower to properly mix with its warm air flow.

It is a further object of the present invention, to provide such an apparatus wherein the flow rate of the gases entering the tanks is substantially the same throughout substantially the entire (longitudinal) length of the conduit, although the gas velocity inside the conduit decreases from the first velocity, at its inlet, to zero at its end.

It is a still further object of the present invention to provide such an apparatus having means for controlling the velocity of the gases received in each tank thereof, for reducing the velocity of the gases to a second reduced velocity, and for maintaining the gases in each tank outlet at a uniform velocity.

It is another object of the present invention to provide such an apparatus which may be inexpensively fabricated and which is relatively easy and inexpensive to maintain.

These aims are attained by installing a set of deflectors at the base of the tanks above the longitudinal slot. Each deflector is disposed on a plane which is substantially perpendicular to the longitudinal slot formed in the conduit, upon which tanks are disposed, and the deflectors are further disposed across the entire width of the tanks. The deflectors have a cross-section which is substantially in the form of an arc of a circle or, if required, an arc of an ellipse or oval. Each of the deflectors further has a curvature extending over (and defined by) a central opening angle which, if required, can be different from one deflector to the next. Preferably, the central opening angle is between 70° and 130°. The radius of the arc of the deflector is, preferably, between 5 and 25% of the width of the deflectors. The deflectors extend over and across the slot formed in the conduit (or piping). These deflectors have bottom edges which are disposed either substantially tangential to, or intersecting the conduit (or piping) cross-section, and the lowest possible position of the bottom edges of the deflectors are such that they touch the lips (or edges) of the slot. Alternatively, the deflectors are disposed slightly above the conduit. The exact position of the deflectors will usually be determined by constructional reasons.

The deflectors are each positioned so that their respective concave faces are oriented in a direction which is upstream of the flow of the gas in the conduit, and they are usually slightly inclined upwards, from upstream to downstream, so that the angle of inclination thereof is between 0° to 30°. The angle of inclination is variable, if required, from one deflector to the next.

The slot has a width which is preferably between 25 and 36% of the diameter of the conduit. The width of the slot can vary either continuously (such as a trapezoidal slot) or in steps along the conduit. Since the height of the deflectors is relatively great, i.e. between a quarter and a fifth of the height of the drop separator panels, their top levels are usually positioned above the bottom edges of the panel bases. In order not to impede lateral expansion of the gases, and so as not to excessively reduce the gas speed at the bottom of the panels, the deflectors are formed with indentations (constituting a reduced height) at their opposite ends. The indentations have a height of about 50% of the height of the (remainder of the) deflectors, and a width approximately equal to that part of the tank which does not correspond to a slot in the piping.

For economic manufacturing purposes, the installation or apparatus preferably comprises a maximum number of identical deflectors, as many as deviation in the uniformity of the gas velocity when crossing the drop separators is acceptable. Finally, the spacings between deflectors is preferably a distance of from one to two times their height.

In accordance with the teachings of the present invention, an apparatus is provided for receiving flue gases from a flue gas source and for discharging the flue gases into a cooling tower. A horizontal conduit is provided. This conduit includes an inlet for receiving the flue gases from the source. The uppermost portion of the conduit has a longitudinal slot formed therein. At least one tank is positioned on the conduit. Each tank overlies the longitudinal slot and is in communication therewith for receiving the gases from the conduit through the longitudinal slot. Each tank has at least one side surface thereof which is in communication with the cooling tower. At least one drop separator panel is disposed in each respective side surface of each tank, whereby gases in each tank pass therethrough and are received in the tower. At least one deflector is disposed in each tank above the longitudinal slot. Each deflector is positioned on a plane which is substantially perpendicular to the slot. In this manner, the velocity of the gases received in each tank from the conduit is controleed, and the gases on the side surface of each tank are maintained at a uniform velocity.

Preferably, the conduit further has a diameter and the longitudinal slot has a width, wherein the width of the longitudinal slot is approximately twenty-five percent (25%) to thirty-six percent (36%) of the diameter of the conduit. In the same or another embodiment, the longitudinal slot has a length and a width, wherein the width is substantially varied along the entire length of the slot. In the same or another embodiment, each drop separator panel further has a height, each deflector has a height, and the height of each deflector is approximately twenty percent (20%) to twenty-five percent (25%) of the height of each drop separator panel. In the same or another embodiment, each deflector is arcuately shaped and has a width and a radius, the radius being approximately five percent (5%) to twenty-five percent (25%) of the width of each deflector. In the same or another embodiment, each deflector further has a curvature defined by a central opening angle, the central opening angle being approximately 70° to 130°.

In the same or a further embodiment, each deflector further has a top edge and a bottom edge. Each deflector is inclined, having the top edge inclined nearer to the upstream end of the conduit than the bottom edge, whereby an angle of inclination is defined. In such an embodiment, preferably the angle of inclination is no greater than approximately 30°. Preferably, the angle of inclination is approximately 10°. In a further embodiment, the angle of inclination may be varied relative to one another.

In accordance with the further teachings of the present invention, an apparatus is provided for receiving flue gases (having a first velocity) from a flue gas source and for reducing the velocity of the gases to a second reduced velocity, and for discharging the flue gases having the second velocity into a cooling tower. A horizontal conduit is provided. This conduit includes an inlet for receiving the flue gases from the source, the gases having the first velocity. The uppermost portion of the conduit has a longitudinal slot formed therein. This slot extends along substantially the entire length of the conduit. At least one tank is positioned on the conduit. This tank overlies the longitudinal slot and is in communication therewith for receiving the gases (having the first velocity) from the conduit through the longitudinal slot. Each tank also has a width. Each tank further has at least one respective side surface thereof which is in communication with the cooling tower plenum. A plurality of deflectors is disposed in each tank above the longitudinal slot and extending over substantially the entire width of the tank. Each of the deflectors is spaced from one another. Each of the deflectors is further positioned on a respective plane which is substantially perpendicular to the slot. In this manner, the deflectors contact the flue gases having the first velocity received in each tank from the conduit through the longitudinal slot, thereby reducing the velocity of the flue gases to the second reduced velocity, controlling the velocity of the gases received in each tank from the conduit, and maintaining the gases on the side surface of each tank at a uniform second reduced velocity. At least one drop separator panel is disposed in each respective side surface of each tank, whereby the gases having the second reduced velocity on the side surface of each tank horizontally pass therethrough and are received in the tower. Each of the panels further has a bottom edge. Each of the deflectors has a respective bottom edge disposed substantially tangentially to the conduit. Each of the deflectors further has a top edge disposed above the bottom edge of each drop separator panel. Each of the deflectors further has a height and a pair of opposite ends. The opposite ends of the deflectors has a reduced height. The reduced height is approximately fifty percent of the height of the remainder of the deflector. Each respective deflector further is substantially arcuate in shape and has a curvature defined by a central opening angle being approximately 120°. Each of the deflectors further has a concave face and an opposite convex face. The convex face is oriented facing substantially in the direction of the inlet end of the conduit. Each respective deflector further is inclined, having the top edge thereof inclined further away from the inlet of the conduit than the bottom edge thereof, whereby an angle of inclination is defined. A longitudinal belt is disposed in the longitudinal slot. A plurality of deflector holders are also provided. Each of the holders has an upwardly-extending portion being selectively and adjustably secured to a respective deflector, whereby the angle of inclination of each deflector may be selectively adjusted independently of one another. Each of the holders further has an outwardly-extending portion which is integral with and extends substantially perpendicularly from the upwardly-extending portion. The outwardly-extending portion is selectively and adjustably secured to the belt, whereby the positioning of each deflector on the belt may be selectively adjusted independently of one another for selectively adjusting the spacing between adjacent deflectors.

These and other objects of the present invention will become apparent from a reading of the following specification, taken in conjunction with the enclosed drawings.

BRIEF DESCRIPTION OF THE DRAWINGS

FIG. 5A is a section view, taken along lines A—A of FIG. 4.

FIG. 5B is a front elevational view of a deflector holder of the present invention.

FIG. 5C is a side elevational view of the deflector holder of FIG. 5B.

FIG. 5D is a top plan view of the deflector holder of FIG. 5B.

FIG. 6 shows the geometrical characteristics of the preferred embodiment of a deflector of the present invention.

GENERAL DESCRIPTION OF THE PREFERRED EMBODIMENTS

Figure 1:
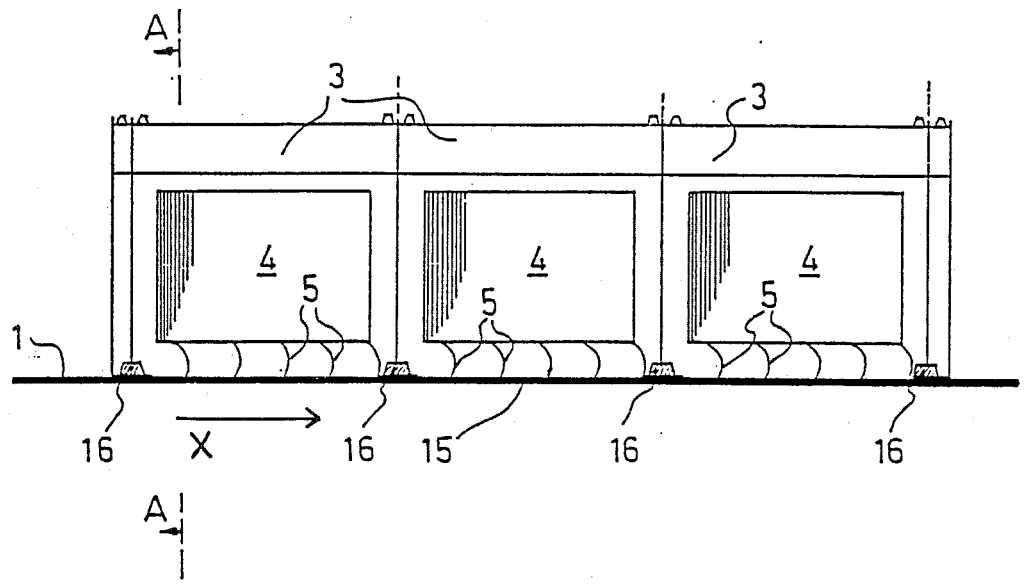
FIG. 1 is a longitudinal cross-sectional view of the apparatus of the present invention, showing the tanks, deflectors and drop separator panels above the conduit (or pipe) system.
Figure 2:
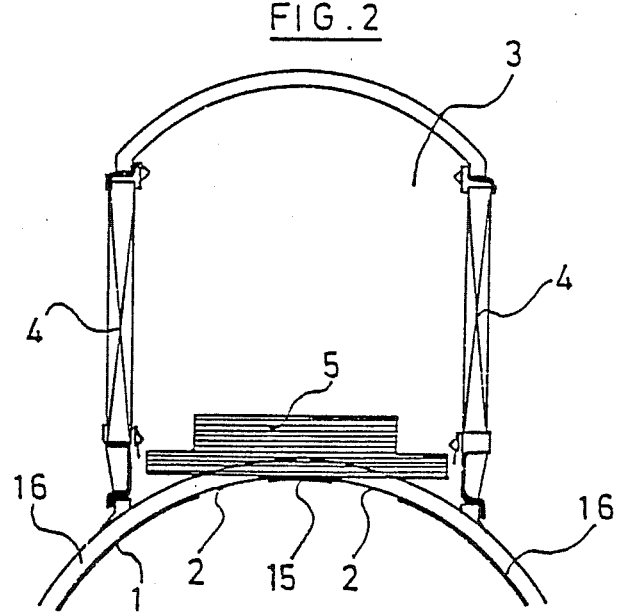
FIG. 2 is a cross-sectional view thereof, taken along lines A—A in FIG. 1.

In the drawings, wherein like reference numbers denote like components, and with particular reference to FIGS. 1 and 2, a horizontal pipe system (or conduit) 1 is illustrated. The conduit 1 has a diameter and length and receives flue gases from a flue gas source. The conduit 1 is formed at its uppermost portion (or top level) with a slot 2 extending over almost its entire longitudinal length. The conduit 1 is surmounted by tanks 3 which overly slot 2 for receiving gases through the slot 2 and for discharging the gases horizontally into the tower through drop separator panels 4.

A set of deflectors 5 is disposed in each tank 3 at the base of each tank 3 and above the longitudinal slot 2. Each of the deflectors 5 is further positioned (or spaced from) each other.

Each of the deflectors 5 is disposed on a plane which is perpendicular to the slot 2 formed in the pipe system. As shown more clearly in FIGS. 2 and 4, the deflectors 5 extend practically over the entire width of the tanks 3. The bottom edges 6 of each deflector 5 are disposed substantially tangentially to the cross-section of conduit 1. As shown more clearly in FIGS. 1, 5A and 6 the preferred shape of the deflectors 5 is illustrated. The deflectors are arcuate in shape, that is, in the form of an arc of a circle, although it may alternatively be in the form of an arc of an ellipse or oval, extending through a central opening angle of e.g. 120° (angle $\alpha$, FIG. 6). The curvature of each of the deflectors 5 is defined by this central opening angle which may vary from approximately 70° to 120°. Deflectors 5 have their concave face oriented upstream of the flow (away from the inlet of the conduit) the direction of flow being indicated by an arrow X in FIG. 1. The convex face of each deflector 5 is oriented substantially in the direction of the downstream end of the conduit.

With reference to FIGS. 5A and 6, each deflector 5 further has a top edge and a bottom edge, with the deflector 5 being inclined backwardly having the top edge inclined nearer to the upstream end of the conduit 1 than the bottom edge, whereby an angle of inclination is defined. Preferably, as shown in FIG. 6, the deflectors are at an inclination of 10° ($\beta$, FIG. 6).

Figure 4:
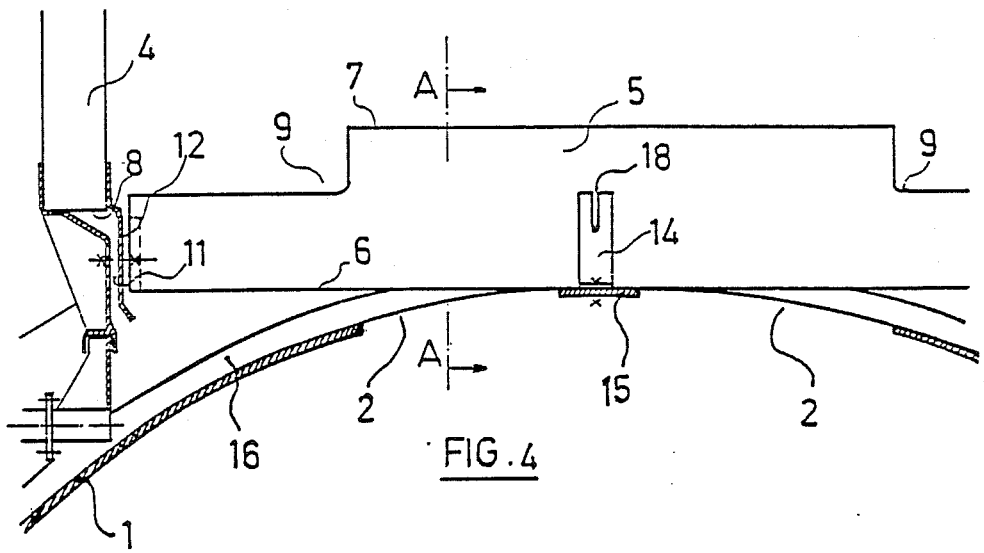
FIG. 4 is an enlarged cross-sectional view of an example of one means for mounting a deflector.

Referring to FIGS. 1, 2 and 4, the height of the deflectors 5 is relatively large compared with the drop separator panels 4. More particularly, and is shown in FIG. 4, their top levels (or top edges) 7 (see FIG. 4) are disposed above the panel bases (or bottom edge of each drop separator panels 4) 8.

The deflectors 5 also have indentations (opposite ends of reduced height) 9 at their opposite ends. Indentations 9 have a height of about 50% the height of the (remainder of) deflectors 5 and a width approximately equal to the part of the tanks not corresponding to a slot 2 in the conduit.

With reference to FIGS. 4, 5A, 5B, 5C and 5D, there is illustrated the preferred method of mounting the deflectors 5. If desired, deflector 5 is suitably secured to drop separator holders 11 by components 12 having stud-holes 13.

Preferably, each of deflectors 5 is suitably and selectively adjustably secured during use by a respective deflector holder 14. Each deflector holder 14 has a respective upwardly-extending portion having a stud-hole 18 formed therein and a respective outwardly-extending portion having a stud-hole 17 formed therein. The outwardly-extending portion is integral with and extends substantially perpendicular from the upwardly-extending portion. The upwardly-extending portion of holder 14 is selectively adjustably secured to, preferably, the convex face of the deflector 5 by, preferably, a bolt which is received through stud-hole 18 and the deflector where it is secured by a nut engaging the bolt. In this manner, the angle of inclination of each deflector 5 may be selectively adjusted independently of one another. In a similar fashion, the outwardly-extending portion of holder 14 is selectively adjustably secured to the belt 15 by, preferably, a bolt being received through the stud-hole 17 and the belt 15 where it is secured by a nut which engages the bolt. In this manner, the positioning of each deflector 5 on the belt 15 may be selectively adjusted independently of one another for selectively adjusting the spacing between adjacent deflectors 5.

Additionally, as shown in FIGS. 1, 2, 3 and 4, a plurality of spaced, intermittent circular reinforcements 16 are radially disposed about the periphery of the conduit 1 supporting the belt 15.

Figure 3:
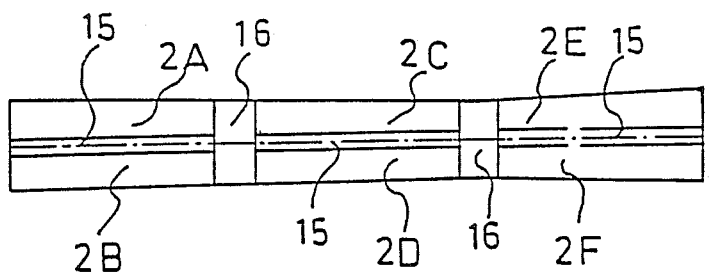
FIG. 3 is a top plan view, showing one embodiment wherein the width of the longitudinal slot varies throughout the longitudinal shape thereof.

FIG. 3 shows an example of a trapezoidal slot 2 varying continuously between 1.22 and 1.45 m and suitable for piping of e.g. 5.00 m in diameter. The slot is made up of openings 2A, 2B, 2C, 2D, 2E and 2F which are separated by reinforcements 16.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. An apparatus for receiving flue gases from a flue gas source and for discharging said flue gases into a cooling tower, said flue gases having a velocity, said apparatus comprising, in combination:

a horizontal conduit including an inlet for receiving the flue gases from the source, said conduit further including an uppermost portion having a longitudinal slot formed therein;

at least one tank positioned on the conduit, overlying the longitudinal slot, and being in communication therewith for receiving the gases from the conduit through the longitudinal slot, each said tank having at least one side surface being in communication with the cooling tower;

at least one drop separator panel disposed in each respective side surface of each tank, whereby gases in each tank may pass therethrough and into the tower; and at least one deflector disposed in each tank above the longitudinal slot, each said deflector being positioned on a respective plane which is substantially perpendicular to the slot, thereby controlling the velocity of the gases received in each tank from the conduit, and thereby maintaining the gases on the side surface of each tank at a uniform velocity.

2. The apparatus of claim 1, further comprised of:
the conduit having a length; and
the longitudinal slot extending along substantially the entire length of the conduit.

3. The apparatus of claim 1, wherein the gases in each tank pass horizontally through each drop separator panel.

4. The apparatus of claim 1, further comprised of:
a plurality of deflectors disposed in each tank above the longitudinal slot, each of said deflectors being spaced from one another, and each of said deflectors being positioned on a respective plane which is substantially perpendicular to the slot, thereby controlling the velocity of the gases received in each tank from the conduit, and thereby maintaining the gases on the side surface of each tank at a uniform velocity.

5. The apparatus of claim 1, further comprised of:
each tank further having a width; and
each deflector extending over substantially the entire width of the tank.

6. The apparatus of claim 1, further comprised of:
each deflector further having a bottom edge, said bottom edge being disposed substantially tangentially to the conduit.

7. The apparatus of claim 1, further comprised of:
the conduit having a diameter; and
the longitudinal slot having a width;
said width of the longitudinal slot being approximately twenty-five percent to thirty-six percent of the diameter of the conduit.

8. The apparatus of claim 1, further comprised of:
the longitudinal slot having a length and a width, said width being substantially varied along the entire length of the slot.

9. The apparatus of claim 1, further comprised of:
each drop separator panel further having a height; and
each deflector further having a height;
said height of each deflector being approximately twenty percent to twenty-five percent of the height of each drop separator panel.

10. The apparatus of claim 1, further comprised of:
each drop separator panel further having a bottom edge;
each deflector further having a top edge; and
the top edge of each deflector being disposed above the bottom edge of each drop separator panel.

11. The apparatus of claim 1, further comprised of:
each deflector having a height and each deflector further having a pair of opposite ends, said opposite ends having a reduced height.

12. The apparatus of claim 11, wherein the reduced height of the opposite ends is approximately fifty percent of the height of the deflector.

13. The apparatus of claim 1, wherein each deflector is substantially arcuate in shape.

14. The apparatus of claim 13, further comprised of:
each arcuate-shaped deflector having a width and a radius, said radius being approximately five percent to twenty-five percent of the width of each said deflector.

15. The apparatus of claim 13, further comprised of:
each deflector further having a curvature defined by a central opening angle, said central opening angle being approximately seventy degrees to one hundred and thirty degrees.

16. The apparatus of claim 15, wherein the central opening angle is approximately one hundred and twenty degrees.

17. The apparatus of claim 13, further comprised of:
each arcuate-shaped deflector having a concave face and an opposite convex face, said convex face being oriented substantially in the direction of the downstream end of the conduit.

18. The apparatus of claim 17, further comprised of:
each deflector further having a top edge and a bottom edge, the top edge of each deflector being inclined nearer to the inlet end of the conduit than the bottom edge, whereby an angle of inclination is defined.

19. The apparatus of claim 18, wherein the angle of inclination is no greater than approximately thirty degrees.

20. The apparatus of claim 18, wherein the angle of inclination is approximately ten degrees.

21. The apparatus of claim 18, wherein the angle of inclination of each deflector is varied, relative to one another.

22. An apparatus for receiving flue gases from a flue gas source and for discharging said flue gases into a cooling tower, said flue gases having a velocity, said apparatus comprising, in combination:

a horizontal conduit including an inlet for receiving the flue gases from the source, said conduit further including an uppermost portion having a longitudinal slot formed therein;

at least one tank positioned on the conduit, overlying the longitudinal slot, and being in communication therewith for receiving the gases from the conduit through the longitudinal slot, each said tank having at least one side surface being in communication with the cooling tower;

at least one drop separator panel disposed in said respective side surface of each tank, whereby gases in each tank may pass therethrough and into the cooling tower;

at least one deflector disposed in each tank above the longitudinal slot, each said deflector being positioned on a respective plane which is substantially perpendicular to the slot, thereby controlling the velocity of the gases received in each tank from the conduit, and thereby maintaining the gases on the side surface of each tank at a uniform velocity;

a longitudinal belt disposed in the longitudinal slot; and at least one deflector holder, each said holder having an upwardly-extending portion being selectively and adjustably secured to a respective deflector, and each said holder further having an outwardly-extending portion integral with, and extending substantially perpendicular from, the upwardly-extending portion, said outwardly-extending portion being selectively and adjustably secured to the belt, whereby the positioning of each deflector may be selectively adjusted.

23. An apparatus for receiving flue gases from a flue gas source and for discharging said flue gases into a cooling tower, said flue gases having a velocity, said apparatus comprising, in combination:

a horizontal conduit including an inlet for receiving the flue gases from the source, said conduit further including an uppermost portion having a longitudinal slot formed therein;

at least one tank positioned on the conduit, overlying the longitudinal slot, and being in communication therewith for receiving the gases from the conduit through the longitudinal slot, each said tank having at least one side surface being in communication with the cooling tower;

at least one drop separator panel disposed in each respective side surface of each tank, whereby gases in each tank may pass therethrough and into the cooling tower;

at least one deflector disposed in each tank above the longitudinal slot, each said deflector being positioned on a respective plane which is substantially perpendicular to the slot, thereby controlling the velocity of the gases received in each tank from the conduit, and thereby maintaining the gases on the side surface of each tank at a uniform velocity;

wherein each deflector is substantially arcuate in shape;

each arcuate-shaped deflector having a concave face and an opposite convex face, said convex face being oriented substantially in the direction of the downstream end of the conduit;

each deflector further having a top edge and a bottom edge, the top edge of each deflector being inclined nearer to the inlet end of the conduit than the bottom edge, whereby an angle of inclination is defined;

a longitudinal belt disposed in the longitudinal slot; and at least one deflector holder, each said holder having an upwardly-extending portion being selectively adjustably secured to a respective deflector, whereby the angle of inclination may be selectively adjusted, and each said holder further having an outwardly-extending portion integral with, and extending substantially perpendicular from, the upwardly-extending portion, said upwardly-extending portion being selectively and adjustably secured to the belt, whereby the positioning of each deflector on the belt may be selectively adjusted.

24. An apparatus for receiving flue gases having a first velocity from a flue gas source, reducing the velocity of said gases to a second reduced velocity, and for discharging said flue gases having the second velocity into a cooling tower, said device comprising, in combination:

a horizontal conduit including an inlet for receiving the flue gases from the source, the conduit having a length and further having an uppermost portion including a longitudinal slot formed therein, said slot extending along substantially the entire length of the conduit;

at least one tank positioned on the conduit, overlying the longitudinal slot and being in communication therewith for receiving the gases having the first velocity from the conduit through the longitudinal slot, each said tank having a width and further having at least one respective side surface being in communication with the cooling tower;

a plurality of deflectors disposed in each tank above the longitudinal slot and extending over substantially the entire width of the tank, each of said deflectors being spaced from one another, and each of said deflectors further being positioned on a respective plane which is substantially perpendicular to the slot, wherein said deflectors contact the flue gases having the first velocity received in each tank from the conduit through the longitudinal slot, thereby reducing the velocity of the flue gases to the second reduced velocity, controlling the velocity of the gases received in each tank from the conduit, and maintaining the gases on the side surface of each tank at a uniform second reduced velocity;

at least one drop separator panel disposed in each said respective side surface of each tank, whereby the gases having the second reduced velocity in each tank horizontally pass therethrough and are received in the tower, each of said panels having a bottom edge;

each of said deflectors having a respective bottom edge disposed substantially tangentially to the conduit and a respective top edge disposed above the bottom edge of each drop separator panel, each of said deflectors further having a height and a pair of opposite ends, said opposite ends of the deflectors having a reduced height, said reduced height being approximately fifty percent of the height of the remainder of the deflector;

each respective deflector further being substantially arcuate in shape and having a curvature defined by a central opening angle being approximately 120°, each of said deflectors further having a concave face and an opposite convex face, said convex face being oriented facing substantially in the direction of the downstream end of the conduit;

each respective deflector further being inclined, such that the top edge thereof is inclined nearer to the inlet of the conduit than the bottom edge thereof, whereby an angle of inclination is defined;

a longitudinal belt disposed in the longitudinal slot; and a plurality of deflector holders, each of said holders having an upwardly-extending portion being selectively and adjustably secured to a respective deflector, whereby the angle of inclination of each deflector may be selectively adjusted independently of one another, and each of said holders further having an outwardly-extending portion integral with, and extending substantially perpendicularly from, the upwardly-extending portion, said outwardly-extending portion being selectively and adjustably secured to the belt, whereby the positioning of each deflector on the belt may be selectively adjusted independently of one another for selectively adjusting the spacing between adjacent deflectors.

25. An apparatus for receiving flue gases from a flue gas source and for discharging said flue gases into a cooling tower, the flue gases having a velocity, said apparatus comprising, in combination;

a horizontal conduit having an inlet for receiving the flue gases from the source and further having a longitudinal slot formed therein;

at least one tank positioned on the conduit, overlying the longitudinal slot and being in communication therewith, for receiving gases from the conduit through the longitudinal slot, each said tank having at least one side surface being in communication with the cooling tower;

a plurality of inclined, arcuate-shaped deflectors disposed in each tank overlying the slot and being spaced from one another, each of said deflectors further having a top edge and a bottom edge, said top edge being inclined nearer to the inlet of the conduit than the bottom edge thereof, whereby an angle of inclination is defined, wherein said deflectors contact the flue gases having the first velocity, thereby reducing the velocity of the flue gases to the second reduced velocity, controlling the velocity of the gases received in each tank from the conduit, and maintaining the gases on the side surface of each tank at a substantially uniform second reduced velocity;

each of said deflectors further having means for selectively adjusting the angle of inclination and for selectively adjusting the spacing between adjacent deflectors; and at least one drop separator panel disposed in each said respective side surface of the tank, whereby gas having the uniform second reduced velocity in each tank passes horizontally therethrough and is received in the tower.

26. An apparatus for receiving flue gases from a flue gas source and for dishcharging said flue gases into a cooling tower, said flue gases having a velocity, said apparatus comprising, in combination:

a conduit including an inlet for receiving the flue gases from the source, said conduit further including an upper portion having a longitudinal slot formed therein;

at least one tank positioned on the conduit, overlying the longitudinal slot, and being in communication therewith for receiving the gases from the conduit through the longitudinal slot, each said tank having at least one side surface being in communication with the cooling tower;

at least one drop separator panel disposed in at least one respective side surface of each tank, whereby gases in each tank may pass therethrough and into the cooling tower; and at least one deflector disposed in each tank above the longitudinal slot, each said deflector being positioned on a respective plane relative to the slot, thereby controlling the velocity of the gases received in each tank form the conduit, and thereby maintaining the gases on the side surface of each tank at a uniform velocity.

* * * * *